United States Patent
Qiao et al.

(10) Patent No.: US 12,278,688 B2
(45) Date of Patent: Apr. 15, 2025

(54) INFORMATION INDICATION METHOD AND APPARATUS FOR NON-TERRESTRIAL COMMUNICATION NETWORK

(71) Applicant: HUAWEI TECHNOLOGIES CO., LTD., Guangdong (CN)

(72) Inventors: Yunfei Qiao, Hangzhou (CN); Yu Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 423 days.

(21) Appl. No.: 17/877,617

(22) Filed: Jul. 29, 2022

(65) Prior Publication Data

US 2023/0142792 A1 May 11, 2023

Related U.S. Application Data

(63) Continuation of application No. PCT/CN2021/074508, filed on Jan. 29, 2021.

(30) Foreign Application Priority Data

Feb. 14, 2020 (CN) .......................... 202010094923.3

(51) Int. Cl.
*H04B 7/185* (2006.01)
*H04B 7/08* (2006.01)
(Continued)

(52) U.S. Cl.
CPC .......... *H04B 7/1855* (2013.01); *H04B 7/088* (2013.01); *H04W 72/23* (2023.01); *H04W 84/06* (2013.01)

(58) Field of Classification Search
CPC .. H04B 7/1855; H04B 7/088; H04B 7/18541; H04B 7/18513; H04L 1/1822;
(Continued)

(56) References Cited

U.S. PATENT DOCUMENTS 5,765,098 A 6/1998 Bella
2019/0149365 A1 5/2019 Chatterjee et al.
(Continued)

FOREIGN PATENT DOCUMENTS

CN 109587789 A 4/2019
CN 109788497 A 5/2019
(Continued)

OTHER PUBLICATIONS

R1-1908934, Asia Pacific Telecom, Discussion on physical layer control procedures for NTN, 3GPP TSG-RAN WG1 Meeting #98, Prague, Czech Republic, Aug. 26-30, 2019, 6 pages.
(Continued)

*Primary Examiner* — Khoa Huynh

(57) ABSTRACT

This application provides an information indication method and apparatus for a non-terrestrial communication network. The method includes: A terminal receives first indication information, where the first indication information includes a bandwidth part BWP indication field, and the BWP indication field indicates a BWP identifier offset; the terminal determines a second bandwidth part identifier BWP_ID based on the BWP identifier offset, where the second BWP_ID corresponds to a target beam of the terminal; and the terminal switches to the target beam. The method extends indication of BWP identifiers on a premise of compatibility with indication based on conventional downlink control information DCI.

20 Claims, 6 Drawing Sheets

(51) Int. Cl.
 *H04W 72/23* (2023.01)
 *H04W 84/06* (2009.01)
(58) Field of Classification Search
 CPC .... H04L 1/0061; H04L 1/1812; H04W 72/23;
 H04W 84/06; H04W 72/0453; H04W
 72/046
 See application file for complete search history.

(56) References Cited

U.S. PATENT DOCUMENTS

| | | | |
|---|---|---|---|
| 2019/0215847 A1 | 7/2019 | Abdoli et al. | |
| 2020/0052782 A1 | 2/2020 | Wang et al. | |
| 2020/0351892 A1* | 11/2020 | Yi | H04L 5/0092 |
| 2021/0022128 A1* | 1/2021 | Chen | H04L 5/0023 |
| 2022/0224405 A1* | 7/2022 | Zhou | H04W 36/00837 |

FOREIGN PATENT DOCUMENTS

| | | | |
|---|---|---|---|
| CN | 110392427 A | 10/2019 | |
| CN | 110536444 A | 12/2019 | |
| WO | 2019091233 A1 | 5/2019 | |

OTHER PUBLICATIONS

R2-1713868, Samsung, Remaining issues on bandwidth part configuration, 3GPP TSG-RAN WG2 NR #100 Meeting, Reno, USA, Nov. 27-Dec. 1, 2017, 6 pages.

* cited by examiner

INFORMATION INDICATION METHOD AND APPARATUS FOR NON-TERRESTRIAL COMMUNICATION NETWORK

CROSS-REFERENCE TO RELATED APPLICATIONS

This application is a continuation of International Application No. PCT/CN2021/074508, filed on Jan. 29, 2021, which claims priority to Chinese Patent Application No. 202010094923.3, filed on Feb. 14, 2020. The disclosures of the aforementioned applications are hereby incorporated by reference in their entireties.

TECHNICAL FIELD

Embodiments of the present invention relate to the field of wireless communication technologies, and in particular, to an information indication method and apparatus for a non-terrestrial communication network.

BACKGROUND

In recent years, application of information technology is further influencing a direction of human society development. An information communication network is also evolving from a fixed network to a mobile network, and from a network with the ground and space isolated to a space-ground integrated network. The space-ground integrated network is an important information infrastructure that extends human activities to the space, the high seas, and even the deep space. The space-ground integrated network can meet needs of the economic and social development pattern transformation and information technology development. It is a key point, focus and direction of the development of information technology, information industry, information network and informatization.

Anon-terrestrial communication network NTN is an important part of the space-ground integrated network, and satellite communication is an important component of non-terrestrial communication. Standards organizations such as the 3rd Generation Partnership Project (3GPP) and the International Telecommunication Union (ITU) have successively carried out research and discussion on satellite communication standards featuring space-ground integration. The research and discussion focus on integration of existing 5th generation mobile network (5G) standards and satellite communication technologies, and define and analyze content such as application scenarios, network structures, and key technologies of 5G satellite networks, to facilitate the global coverage of the space-ground integrated networks. Currently, research has been initiated and studies have been conducted on integration of satellites and 5G. This application focuses on an information indication technology under a satellite and 5G converged architecture. Satellite communication features a long communication distance, a large coverage area, flexible networking, and the like. In some important fields such as space communication, aviation communication, and military communication, a satellite communication technology plays an irreplaceable role. A satellite network can serve fixed terminals, and can also serve various mobile terminals.

In a wireless communication system, a bandwidth part (BWP) is a segment of continuous frequency domain resources. The bandwidth part may also be referred to as a carrier bandwidth part (carrier BWP). In a new radio access technology (NR), a base station may configure a maximum of four BWPs for a terminal (UE, User Equipment) in a serving cell. Currently, in discussion of an NR-based NTN, BWP-based beam switching is proposed, that is, different BWPs are allocated to different beams in a cell, and functions of beam switching and beam management are implemented by operating the BWPs. To implement beam switching in a cell, it is an appropriate implementation to indicate an activated BWP_ID based on downlink control information (DCI). However, in a conventional technology, indication based on DCI is limited by a quantity of DCI bits. Currently, a maximum of four BWPs can be indicated. In a satellite scenario, there are far more than four beams, and different user distributions and different service requirements may require more than four BWPs accordingly. Consequently, current indication based on the DCI has a great limitation.

SUMMARY

This application provides an information indication method and apparatus for a non-terrestrial communication network, to extend indication of BWP_IDs on a premise of compatibility with conventional indication based on DCI.

The following describes this application from a plurality of aspects. It is easy to understand that mutual reference may be made to implementations of these aspects.

According to a first aspect, this application provides an information indication method. The method is applied to a terminal device or a terminal chip, and the method includes: The terminal receives first indication information, where the first indication information includes a bandwidth part BWP indication field, and the BWP indication field indicates a BWP identifier offset; the terminal determines a second bandwidth part identifier BWP_ID based on the BWP identifier offset, where the second BWP_ID corresponds to a target beam of the terminal; and the terminal switches to the target beam. It may be understood that, in a satellite communication network, a plurality of beams are configured in one satellite, and each beam may be considered as a beam in a cell or an independent cell. The serving beam and the target beam herein each may be considered as an independent cell or a beam in a cell. A method for managing different beams in a same cell is similar to that for managing different beams in different cells. The two cases are not distinguished herein. A bandwidth part identifier can be effectively indicated by using the information indication method. Specifically, a range indication capability of the BWP identifier is enhanced by using the indication method. In addition, the method is easy to be compatible with an existing communication standard.

In a possible implementation, the terminal determines the second bandwidth part identifier BWP_ID based on the BWP identifier offset and a first bandwidth part identifier BWP_ID, where the first bandwidth part identifier BWP_ID corresponds to a current serving beam of the terminal.

In a possible implementation, before the terminal receives the first indication information, the method further includes: The terminal receives the first bandwidth part identifier BWP_ID. It is easy to understand that a network device may receive the first BWP_ID only when the information indication method is used for a first time, and in subsequent information indication, the second BWP_ID and the corresponding target beam may be determined based on the buffered first BWP_ID and with reference to the first indication information. Certainly, besides that the first BWP_ID may be used when the information indication method is used for the first time, when the network device or the terminal detects that indication based on an BWP_ID is incorrect and needs to be corrected, the first BWP_ID may also be sent by the network device to the terminal. In addition, the first BWP_ID may also be sent by the network device to the terminal at regular time (periodically or irregularly).

In a possible implementation, that the terminal receives a bandwidth part BWP indication field includes: When the terminal receives the first indication information, a preset condition for satellite beam switching is met.

In a possible implementation, the method further includes: The terminal receives a first RRC message, where the first RRC message includes a BWP_ID configuration field, the BWP_ID configuration field defines a value configuration of a BWP_ID, and the BWP_ID configuration field includes a maximum offset value and/or a minimum offset value.

In a possible implementation, the method alternatively includes: The terminal receives a first RRC message, where the first RRC message includes a BWP_ID configuration field, the BWP_ID configuration field defines a value configuration of a BWP_ID, and the BWP_ID configuration field includes a first identifier offset value, a second identifier offset value, . . . , and an $N^{th}$ identifier offset value, where the identifier offset value is an integer, and N is an integer greater than or equal to 1. In another possible implementation, the identifier offset value may be the BWP_ID corresponding to the target beam. In this case, the terminal needs to learn of only the first indication information to determine that target beam switching is completed.

In a possible implementation, the first BWP_ID is carried in a second RRC message. The second RRC message and the first RRC message may not be a same RRC message. The second RRC message is different from the first RRC message, and the first RRC message may be an initial RRC.

In a possible implementation, the first indication message is downlink control information DCI.

In a possible implementation, the terminal determines the second BWP_ID according to a preset formula to perform beam switching. The preset formula includes: second BWP_ID=first BWP_ID+BWP identifier offset, where the first BWP_ID corresponds to the current serving beam of the terminal, and the second BWP_ID corresponds to the target beam of the terminal.

According to a second aspect, this application provides another information indication method. The method is applied to a network device or a network device chip, and the method includes: The network device sends a first bandwidth part identifier BWP_ID, where the first BWP_ID corresponds to a current serving beam of a terminal; and the network device sends first indication information, where the first indication information includes a bandwidth part BWP indication field, the BWP indication field indicates a BWP identifier offset, and the BWP identifier offset indicates an offset value of an identifier of a target beam of the terminal relative to the first BWP_ID. It may be understood that, in a satellite communication network, a plurality of beams are configured in one satellite, and each beam may be considered as a beam in a cell or an independent cell. The serving beam and the target beam herein each may be considered as an independent cell or a beam in a cell. A method for managing different beams in a same cell is similar to that for managing different beams in different cells. The two cases are not distinguished herein.

In a possible implementation, that the network device sends a bandwidth part BWP indication field includes: If the network device detects that a preset condition for satellite beam switching is met, the network device determines the bandwidth part BWP indication field based on the first BWP_ID and a second BWP_ID, and the network device sends the bandwidth part BWP indication field, where the second BWP_ID corresponds to the target beam serving the terminal.

In a possible implementation, the method further includes: The network device sends a first radio resource control RRC message. The first RRC message includes a BWP_ID configuration field, the BWP_ID configuration field defines a value configuration of a BWP_ID increment, and the BWP_ID configuration field includes a maximum offset value and/or a minimum offset value.

In a possible implementation, the first BWP_ID is carried in a second radio resource control RRC message.

In a possible implementation, the first indication message is downlink control information DCI.

According to a third aspect, this application provides a communication apparatus. The apparatus includes: a receiving module, configured to receive first indication information, where the first indication information includes a bandwidth part BWP indication field, and the BWP indication field indicates a BWP identifier offset; and a processing module, configured to determine a second bandwidth part identifier BWP_ID based on the BWP identifier offset, where the second BWP_ID corresponds to a target beam of the terminal. The processing module is configured for switching to the target beam.

In a possible implementation, the processing module is specifically configured to determine the second bandwidth part identifier BWP_ID based on the BWP identifier offset and a first bandwidth part identifier BWP_ID, where the first bandwidth part identifier BWP_ID corresponds to a current serving beam of the terminal.

In a possible implementation, before the receiving module receives the first indication information, the receiving module is further configured to receive the first bandwidth part identifier BWP_ID. It is easy to understand that a network device may receive the first BWP_ID only when the information indication method is used for a first time, and in subsequent information indication, the second BWP_ID and the corresponding target beam may be determined based on the buffered first BWP_ID with reference to the first indication information. Certainly, besides that the first BWP_ID may be used when the information indication method is used for the first time, when the network device or the terminal detects that indication based on an BWP_ID is incorrect and needs to be corrected, the first BWP_ID may also be sent by the network device to the terminal. In addition, the first BWP_ID may also be sent by the network device to the terminal at regular time (periodically or irregularly).

In a possible implementation, that the receiving module receives a bandwidth part BWP indication field includes: When the receiving module receives the first indication information, a preset condition for satellite beam switching is met.

In a possible implementation, the receiving module is further configured to receive a first RRC message, where the first RRC message includes a BWP_ID configuration field, the BWP_ID configuration field defines a value configuration of a BWP_ID, and the BWP_ID configuration field includes a maximum offset value and/or a minimum offset value. Alternatively, the receiving module is further configured to receive a first RRC message, where the first RRC message includes a BWP_ID configuration field, the BWP_ID configuration field defines a value configuration of a BWP_ID, and the BWP_ID configuration field includes a first identifier offset value, a second identifier offset value, . . . , and an $N^{th}$ identifier offset value, where the identifier offset value is an integer, and N is an integer greater than or equal to 1. In another possible implementation, the identifier offset value may be the BWP_ID corresponding to the target beam. In this case, the terminal needs to learn of only the first indication information to determine that target beam switching is completed.

In a possible implementation, the first BWP_ID is carried in a second RRC message. The second RRC message is different from the first RRC message, and the first RRC message may be an initial RRC.

In a possible implementation, the first indication message is downlink control information DCI.

In a possible implementation, the processing module is configured to determine the second BWP_ID according to a preset formula to perform beam switching. The preset formula includes: second BWP_ID=first BWP_ID+BWP identifier offset, where the first BWP_ID corresponds to the current serving beam of the terminal, and the second BWP_ID corresponds to the target beam of the terminal.

According to a fourth aspect, this application provides a communication apparatus. The apparatus includes a sending module, configured to send a first bandwidth part identifier BWP_ID, where the first BWP_ID corresponds to a current serving beam of a terminal; and the sending module is further configured to send first indication information, where the first indication information includes a bandwidth part BWP indication field, the BWP indication field indicates a BWP identifier offset, and the BWP identifier offset indicates an offset value of an identifier of a target beam of the terminal relative to the first BWP_ID.

In a possible implementation, that the sending module sends a bandwidth part BWP indication field includes: If a processing module detects that a preset condition for satellite beam switching is met, the processing module determines the bandwidth part BWP indication field based on the first BWP_ID and a second BWP_ID; and the sending module sends the bandwidth part BWP indication field, where the second BWP_ID corresponds to the target beam serving the terminal.

In a possible implementation, the sending module is further configured to send a first radio resource control RRC message. The first RRC message includes a BWP_ID configuration field, the BWP_ID configuration field defines a value configuration of a BWP_ID increment, and the BWP_ID configuration field includes a maximum offset value and/or a minimum offset value.

In a possible implementation, the first BWP_ID is carried in a second radio resource control RRC message.

In a possible implementation, the first indication message is downlink control information DCI.

According to a fifth aspect, this application further provides a HARQ ID information indication manner. The method includes: A terminal receives first indication information sent by a network device, where the first indication information includes offset information of a hybrid automatic repeat request process identifier HARQ_process_ID; the terminal determines a current HARQ_process_ID based on a previous HARQ_process_ID and the first indication information; and the terminal sends and/or receives data based on the current HARQ_process_ID.

In a possible implementation, before the terminal receives the first indication information sent by the network device, the method further includes: The terminal receives the previous hybrid automatic repeat request process identifier HARQ_process_ID.

In a possible implementation, that the terminal receives offset information of a HARQ_process_ID includes: When the terminal receives the offset information of the HARQ_process_ID, a preset condition for a scheduling result is met. The offset information of the HARQ_process_ID indicates an offset of the HARQ process identifier.

In a possible implementation, the method further includes: The terminal receives a first RRC message. The first RRC message includes a HARQ_ID configuration field, the HARQ_ID configuration field defines a value configuration of a HARQ_ID, and the HARQ_ID configuration field includes a maximum offset value and/or a minimum offset value. In another optional solution, the terminal receives a first RRC message. The first RRC message includes a HARQ_ID configuration field, the HARQ_ID configuration field defines a value configuration of a HARQ_ID, and the HARQ_ID configuration field includes a first identifier offset value, a second identifier offset value, . . . , and an $N^{th}$ identifier offset value, where the identifier offset value is an integer, and N is an integer greater than or equal to 1. In another possible implementation, the identifier offset value may be the HARQ_process_ID corresponding to current scheduling. In this case, the terminal needs to learn of only the first indication information to determine the HARQ process identifier corresponding to current scheduling. The possible implementation may be performed before the terminal receives the first indication information sent by the network device, or certainly may be performed before the terminal receives the previous hybrid automatic repeat request process identifier HARQ_process_ID.

In a possible implementation, the terminal receives first downlink control information DCI. The first DCI includes the HARQ process identifier field.

In a possible implementation, the terminal receives a DCI indication from the network device, and the terminal determines a second HARQ_process_ID according to a preset formula for data sending and/or receiving. The preset formula includes: second HARQ_process_ID=first HARQ_process_ID+HARQ process identifier offset.

According to a sixth aspect, this application provides another communication apparatus. The apparatus includes a processor and a memory. The processor and the memory are electrically coupled. The memory is configured to store computer program instructions. The processor is configured to execute a part or all of the computer program instructions in the memory. When the part or all of the computer program instructions are executed, the communication apparatus is enabled to implement the information indication method according to any one of the first aspect or the possible implementations of the first aspect, the information indication method according to any one of the second aspect or the possible implementations of the second aspect, or the method according to any one of the fifth aspect or the possible implementations of the fifth aspect. In a possible implementation, a transceiver is further included, and is configured to send a signal processed by the processor, or receive a signal and input the signal to the processor. In a possible design, the communication apparatus may be a chip system. The chip system may further include a memory. The memory is configured to store program instructions and/or data. The chip system may include a chip, or may include a chip and another discrete component. In another possible design, the chip system may further include a communication interface. The communication interface may be used for data exchange with another component. For example, the communication interface is a pin on a chip.

According to a seventh aspect, this application further provides a computer-readable storage medium. The computer storage medium stores computer-readable instructions. When a computer reads and executes the computer-readable instructions, the information indication method according to any one of the first aspect or the possible implementations of the first aspect, the information indication method according to any one of the second aspect or the possible implementations of the second aspect, or the method according to any one of the fifth aspect or the possible implementations of the fifth aspect is performed.

According to an eighth aspect, this application provides a computer program product. The computer program product includes computer program code. When the computer program code is executed on a computer, the information indication method according to any one of the first aspect or the possible implementations of the first aspect, the information indication method according to any one of the second aspect or the possible implementations of the second aspect, or the method according to any one of the fifth aspect or the possible implementations of the fifth aspect is performed.

According to a ninth aspect, a communication system is provided. The system may include the terminal device that performs the method according to any one of the first aspect or the possible implementations of the first aspect, and the network device that performs the method according to any one of the second aspect or the possible implementations of the second aspect, or the communication apparatus according to the third aspect or the possible implementations of the third aspect, the terminal and the network device according to the fifth aspect or the possible implementations of the fifth aspect, or the communication apparatus according to the sixth aspect.

BRIEF DESCRIPTION OF DRAWINGS

To describe the technical solutions in embodiments of the present invention or in the conventional technology more clearly, the following briefly describes the accompanying drawings used in describing the background and embodiments. It is clear that the accompanying drawings in the following descriptions show merely a part of embodiments of the present invention, and a person of ordinary skill in the art may still derive other drawings or embodiments based on these drawings or descriptions without creative efforts. The present invention aims to cover all these derived drawings or embodiments.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that specific embodiments described herein are merely used to explain the present invention, but are not intended to limit the present invention. It is clear that the described embodiments are merely a part but not all of embodiments of the present invention. All other embodiments obtained by a person skilled in the art based on embodiments of the present invention without making creative efforts shall fall within the protection scope of the present invention.

The technical solutions in embodiments of this application may be applied to various communication systems, for example, a terrestrial communication system, and a non-terrestrial communication system, for example, a satellite communication system. The satellite communication system may be integrated with a conventional mobile communication system. For example, the mobile communication system may be a fourth generation communications system (for example, a long term evolution (LTE) system), a worldwide interoperability for microwave access (WiMAX) communication system, a fifth generation communication system (for example, a new radio (NR) system), and a future mobile communication system.

Figure 1:
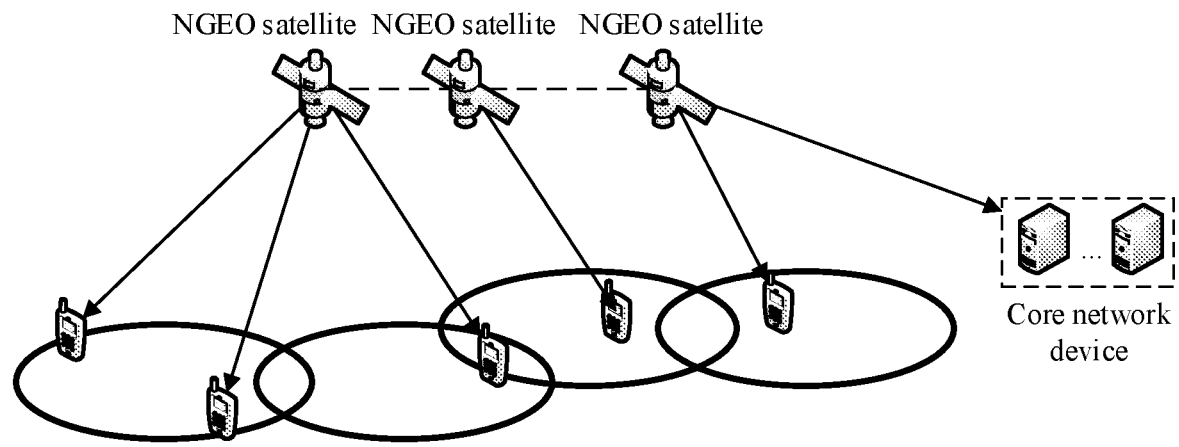
FIG. 1 is a schematic diagram of satellite coverage areas.

For example, FIG. 1 is a schematic diagram of a possible architecture of a satellite communication system to which this application is applicable. If a parallel is drawn between a satellite communication system and a terrestrial communication system, a satellite may be considered as one or more terrestrial network devices, for example, base stations. Alternatively, it may be considered that an access network device is deployed on a satellite. Through an access point 1, an access point 2, or even an access point 3 to an access point n (not shown in the figure), the satellite provides a communication service for a terminal device, and the satellite may further be connected to a core network device (for example, an access and mobility management function (AMF) through a radio link. In addition, there is a radio link between satellites to implement signaling exchange and user data transmission between base stations. The satellite may be a non-geostationary earth orbit (NGEO) satellite or a geostationary earth orbit (GEO) satellite.

This application is also applicable to a terrestrial communication system. In this case, the satellite in FIG. 1 may be replaced with a terrestrial network device.

For ease of understanding embodiments of this application, the following describes a part of terms in embodiments of this application, to help a person skilled in the art have a better understanding.

(1) A terminal device, also referred to as user equipment (UE), a mobile station (MS), a mobile terminal (MT), or the like, is a device that provides voice and/or data connectivity for a user. For example, the terminal device includes a handheld device, a vehicle-mounted device, an Internet-of-Things device, or the like that has a wireless connection function. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, or the like.

(2) A network device is a device configured to communicate with a terminal device. The network device may be a non-terrestrial network device, for example, a satellite or a high-altitude communication platform; may be a terrestrial network device, for example, a base station. Alternatively, the network device may be an evolved NodeB (eNB, or eNodeB) in an LTE system or a radio controller in a cloud radio access network (CRAN) scenario, Alternatively, the network device may be a relay node, an access point, a vehicle-mounted device, a next generation Node B (gNodeB) in a 5G network, device-to-device (D2D) communication, machine communication, or another future network communication system, or the like. This is not limited in embodiments of this application.

(3) A core network device includes but it not limited to an access and mobility management function network element. The AMF has a core network control plane function, and provides mobility management and access management functions for a user. The AMF is responsible for user access management, security authentication, and mobility management. A user plane unit is responsible for managing user plane data transmission, traffic statistics collection, lawful interception, and the like.

(4) A satellite beam is a shape of an electromagnetic wave emitted by a satellite antenna on a surface of the earth, as a light beam of a flashlight has a specific range. Alternatively, signals emitted by the satellite are not radiated at 360°, but are signal waves emitted intensively in a specific azimuth.

The term "and/or" in this application describes an association relationship between associated objects and indicates that three relationships may exist. For example, A and/or B may represent the following three cases: Only A exists, both A and B exist, and only B exists. The character "/" usually indicates an "or" relationship between the associated objects.

"A plurality of" in this application means two or more.

In the descriptions of this application, terms such as "first" and "second" are merely used for distinction and description, and should not be understood as an indication or implication of relative importance or an indication or implication of an order.

In addition, the term "for example" in embodiments of this application is used to indicate giving an example, an illustration, or a description. Any embodiment or implementation solution described as an "example" in this application should not be explained as being more preferred or having more advantages than another embodiment or implementation solution. Exactly, the term "example" is used to present a concept in a specific manner.

For ease of understanding embodiments of this application, the following describes an application scenario of this application. A service scenario described in embodiments of this application is intended to describe the technical solutions in embodiments of this application more clearly, and does not constitute a limitation on the technical solutions provided in embodiments of this application. A person of ordinary skill in the art may learn that, as a new service scenario emerges, the technical solutions provided in embodiments of this application are also applicable to a similar technical problem.

Figure 2:
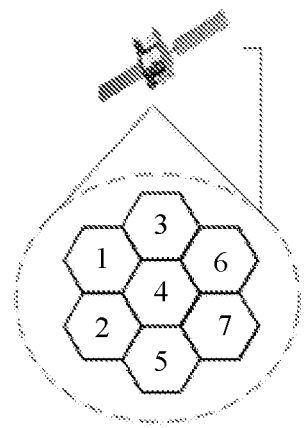
FIG. 2 is a schematic diagram of satellite beam division.

In a wireless communication system, a bandwidth part is a segment of continuous frequency domain resources. The bandwidth part may also be referred to as a carrier bandwidth part (carrier BWP). In NR, a base station may configure a maximum of four BWPs for one UE in a serving cell. Only one BWP can be activated for one UE at a time. The UE sends and receives data on the activated BWP. To implement beam switching in a cell, it is an appropriate implementation to indicate an activated BWP identifier (ID) based on DCI. However, in a conventional technology, indication based on DCI is limited by a quantity of DCI bits (a maximum of two bits are used to indicate a BWP ID). A maximum of four BWPs can be indicated. In a satellite network, one beam is usually considered as one BWP. In a schematic diagram of satellite beam division shown in FIG. 2, beams of a satellite A may be divided into at least seven beams. Identifiers (ID) of the divided beams are 1 to 7. The schematic diagram is to be used in the following specific embodiments. A high-throughput satellite can transmit even as many as hundreds of beams, which are far more than four beams. Different user distributions and different service requirements may require more than four BWPs accordingly. Consequently, the current indication based on DCI has a great limitation, and a BWP with an ID number greater than 4 cannot be indicated for switching.

Figure 3:
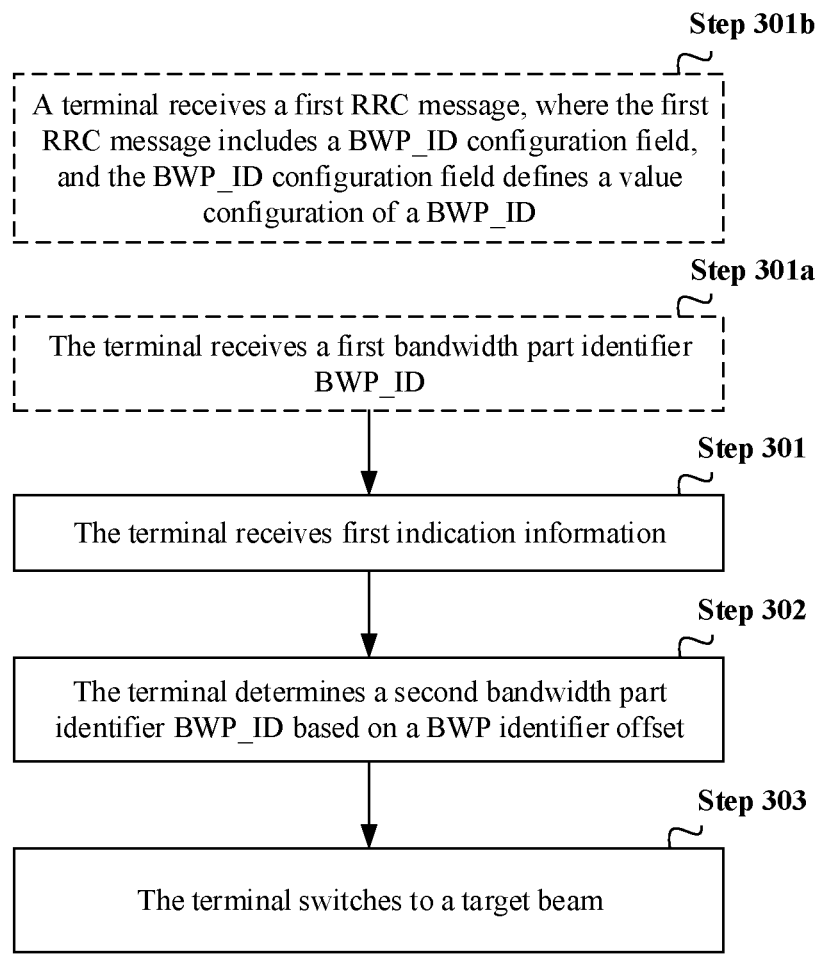
FIG. 3 is a schematic diagram of a process of an information indication method according to an embodiment of this application.

With regard to the foregoing problem, this application provides a BWP identifier (ID) indication method applicable to a non-terrestrial communication network, and especially a satellite network, to resolve an ID indication problem caused by an increase in a quantity of BWPs in an NTN network. A mapping relationship between a beam and a BWP is established, and an increment or a change of a target BWP ID relative to a source BWP ID is notified to a user with reference to a beam topology of a cell, to extend indication of BWP IDs on a premise of compatibility with a conventional DCI format This application provides an information indication method, to extend an indication range of a bandwidth part identifier on a premise of compatibility with a DCI format in conventional NR. A schematic diagram of a process of an information indication method may be shown in FIG. 3. The method is applied to a terminal device or a terminal chip. The method includes the following steps.

Step 301: A terminal receives first indication information, where the first indication information includes a bandwidth part BWP indication field, and the BWP indication field indicates a BWP identifier offset.

Step 302: The terminal determines a second bandwidth part identifier BWP_ID based on the BWP identifier offset, where the second BWP_ID corresponds to a target beam of the terminal.

Step 303: The terminal switches to the target beam.

It may be understood that, in a satellite communication network, a plurality of beams are configured in one satellite, and each beam may be considered as a beam in a cell or an independent cell. The serving beam and the target beam herein each may be considered as an independent cell or a beam in a cell. A method for managing different beams in a same cell is similar to that for managing different beams in different cells. The two cases are not distinguished herein.

Optionally, the terminal determines the second bandwidth part identifier BWP_ID based on the BWP identifier offset and a first bandwidth part identifier BWP_ID, where the first bandwidth part identifier BWP_ID corresponds to a current serving beam of the terminal.

Optionally, before step 301, the method further includes step 301a: The terminal receives the first bandwidth part identifier BWP_ID. For example, the terminal may complete an RRC setup process on an initial BWP. A network device feeds back, in an RRC-setup message, a bandwidth part identifier BWP-ID corresponding to the current serving beam of the terminal to the terminal, to serve as a BWP serving the terminal after the terminal enters an RRC-connected state. For convenience, similar identifiers such as bandwidth part identifiers BWP_ID and BWP-ID may be used alternatively, and are not distinguished.

It is easy to understand that the network device may receive the first BWP_ID only when the information indication method is used for a first time, and in subsequent information indication, the second BWP_ID and the corresponding target beam may be determined based on the buffered first BWP_ID and with reference to the first indication information. Certainly, besides that the first BWP_ID may be used when the information indication method is used for the first time, when the network device or the terminal detects that indication based on an BWP_ID is incorrect and needs to be corrected, the first BWP_ID may also be sent by the network device to the terminal. In addition, the first BWP_ID may also be sent by the network device to the terminal at regular time (periodically or irregularly).

Optionally, that the terminal receives a bandwidth part BWP indication field includes: When the terminal receives the first indication information, a preset condition for satellite beam switching is met. For example, the network device detects a beam switching request, that is, a preset condition for satellite beam switching is met. The preset condition may include one or more, or all of a beam switching request flag, a satellite location, a terminal location, cell service duration, a cell cluster service identifier, and the like. The conditions listed here are only examples. After the preset condition for satellite beam switching is met, the network device obtains a difference between the BWP-ID corresponding to the target beam and a BWP-ID corresponding to a source beam, map a corresponding bit to a bandwidth part BWP indication field (Bandwidth part indicator) in DCI according to a predefined table or mapping relationship, and deliver the field to the terminal. A field length of 2 bits is used as an example. Fields related to BWP-ID indications in the DCI are shown in Table 1.

TABLE 1

| BWP-ID indication field in DCI | |
|---|---|
| BWP indication field | BWP ID offset |
| 00 | Offset 1 (e.g., 1) |
| 01 | Offset 2 (e.g., 2) |
| 10 | Offset 3 (e.g., 3) |
| 11 | Offset 4 (e.g., 4) |

Optionally, the method further includes step 301b: The terminal receives a first RRC message, where the first RRC message includes a BWP_ID configuration field, the BWP_ID configuration field defines a value configuration of a BWP_ID, and the BWP_ID configuration field includes a maximum offset value and/or a minimum offset value. Optionally, in another solution, the terminal receives a first RRC message, where the first RRC message includes a BWP_ID configuration field, the BWP_ID configuration field defines a value configuration of a BWP_ID, and the BWP_ID configuration field includes a first identifier offset value, a second identifier offset value, . . . , and an $N^{th}$ identifier offset value, where the identifier offset value is an integer, and N is an integer greater than or equal to 1. In another possible implementation, the identifier offset value may be the BWP_ID corresponding to the target beam. In this case, the terminal needs to learn of only the first indication information to determine that target beam switching is completed. Step 301b may be performed before step 301, or certainly may be performed before step 301a. For example, in an RRC message, a new field may be added to define a value configuration of a BWP-ID, for example, a downlink BWP-ID-offset-value and an uplink BWP-ID-offset-value. For specific message content, refer to the following example.

```
ServingCellConfig ::=                              SEQUENCE {
    tdd-UL-DL-ConfigurationDedicated                   TDD-UL-DL-ConfigDedicated
OPTIONAL,    -- Cond TDD
    initialDownlinkBWP                                 BWP-DownlinkDedicated
OPTIONAL,    -- Need M
    downlinkBWP-ToReleaseList                          SEQUENCE  (SIZE
(1 . . . maxNrofBWPs)) OF BWP-Id                  OPTIONAL,   -- Need N
    downlinkBWP-ToAddModList                           SEQUENCE   (SIZE
(1 . . . maxNrofBWPs)) OF BWP-Downlink            OPTIONAL,   -- Need N
    downlinkBWP-ID-offset-value                    SEQUENCE (SIZE (1 . . . 4)) OF INTEGER
(-Maximum_offset, . . . , Maximum_offset)   OPTIONAL,   -- Need N
    firstActiveDownlinkBWP-Id                              BWP-Id
OPTIONAL,    -- Cond SyncAndCellAdd
    bwp-InactivityTimer                                ENUMERATED {ms2, ms3, ms4, ms5,
ms6, ms8, ms10, ms20, ms30,
                                                                         ms40,ms50,   ms60,
ms80,ms100, ms200,ms300, ms500,
                                                                         ms750,    ms 1280,
ms 1920, ms2560, spare10, spare9, spare8,
                                                                         spare7,    spare6,
spare5, spare4, spare3, spare2, spare1 }     OPTIONAL,   --Need R
    defaultDownlinkBWP-Id                                  BWP-Id
OPTIONAL,    -- Need S
    . . .
}
```

-continued

```
UplinkConfig ::=                            SEQUENCE {
    initialUplinkBWP                           BWP-UplinkDedicated
OPTIONAL,    -- Need M
        uplinkBWP-ToReleaseList                        SEQUENCE    (SIZE
(1 . . . maxNrofBWPs)) OF BWP-Id        OPTIONAL,    -- Need N
        uplinkBWP-ToAddModList                         SEQUENCE    (SIZE
(1. . . maxNrofBWPs)) OF BWP-Uplink     OPTIONAL,    -- Need N
    firstActiveUplinkBWP-Id                        BWP-Id
OPTIONAL,    -- Cond SyncAndCellAdd
    uplinkBWP-ID-offset-value               SEQUENCE (SIZE (1 . . . 4)) OF INTEGER
(-Maximum_offset, . . . , Maximum_offset)   OPTIONAL,    -- Need N
    . . .
    }
```

The downlink BWP-ID-offset-value is used as an example for specific description. Maximum_offset indicates a maximum ID offset value defined in a system, and the offset has four values according to the setting in the SEQUENCE. A range from a minimum ID offset value to the maximum ID offset value is averaged to four values. It is easy to understand that the minimum ID offset value and the maximum ID offset value may be same or different in absolute value. A step between two offset values may also be changed. Examples are not provided herein one by one. This possible design differs from the foregoing in that the ID offset value is defined in the RRC message and delivered to the terminal.

In this optional design, after detecting a beam switching request, the network device obtains a difference between the BWP-ID corresponding to the target beam and the BWP-ID corresponding to the source beam, map a corresponding bit to a bandwidth part BWP indication field in DCI according to a predefined table or mapping relationship, and deliver the field to the terminal. For example, bits in different indication fields correspond to different downlink BWP-ID-offset-values and/or uplink BWP-ID-offset-values. The predefined table or mapping relationship is slightly different from Table 1. A field length of two bit is used as an example. Fields related to BWP-ID indications in the DCI are shown in Table 2.

TABLE 2

BWP-ID indication field in DCI

| BWP indication field | BWP ID offset |
| --- | --- |
| 00 | $1^{st}$-downlink BWP-ID-offset-value |
| 01 | $2^{nd}$-downlink BWP-ID-offset-value |
| 10 | $3^{rd}$-downlink BWP-ID-offset-value |
| 11 | $4^{th}$-downlink BWP-ID-offset-value |

Optionally, the first BWP_ID is carried in a second RRC message. The second RRC message and the first RRC message may not be a same RRC message. The second RRC message is different from the first RRC message, and the first RRC message may be an initial RRC.

In a possible implementation, the first indication message is downlink control information DCI.

Specifically, the terminal receives the indication based on DCI from the network device, and the terminal determines the second BWP_ID according to a preset formula to perform beam switching. The preset formula includes: second BWP_ID=first BWP_ID+BWP identifier offset, where the first BWP_ID corresponds to the current serving beam of the terminal, and the second BWP_ID corresponds to the target beam of the terminal. For example, for the terminal and the network device shown in FIG. 1, when a beam serving the terminal is switched from a beam 2 to a beam 5, according to the table or mapping relationship predefined in Table 1, a value of the bandwidth part BWP indication field in the DCI delivered by the network device is (10).

Figure 4:
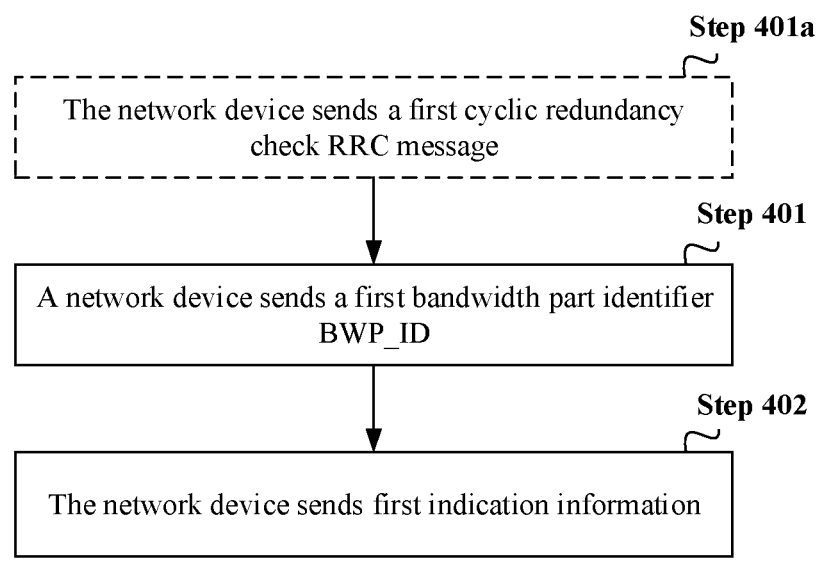
FIG. 4 is a schematic diagram of a process of another information indication method according to an embodiment of this application.

The information indication manner applied to a terminal is described above. The following describes an information indication manner applied to a network device. A specific process may be shown in FIG. 4. For an implementation example of steps, refer to the example in the foregoing implementation method of the terminal. Details are not described herein again. The method is applied to a network device or a network device chip, and the method includes the following steps.

Step 401: A network device sends a first bandwidth part identifier BWP_ID, where the first BWP_ID corresponds to a current serving beam of a terminal; and Step 402: The network device sends first indication information, where the first indication information includes a bandwidth part BWP indication field, the BWP indication field indicates a BWP identifier offset, and the BWP identifier offset indicates an offset value of an identifier of a target beam of the terminal relative to the first BWP_ID.

It may be understood that, in a satellite communication network, a plurality of beams are configured in one satellite, and each beam may be considered as a beam in a cell or an independent cell. The serving beam and the target beam herein each may be considered as an independent cell or a beam in a cell. A method for managing different beams in a same cell is similar to that for managing different beams in different cells. The two cases are not distinguished herein.

Optionally, in step 402, that the network device sends a bandwidth part BWP indication field includes: If the network device detects that a preset condition for satellite beam switching is met, the network device determines the bandwidth part BWP indication field based on the first BWP_ID and a second BWP_ID, and the network device sends the bandwidth part BWP indication field, where the second BWP_ID corresponds to the target beam serving the terminal.

Optionally, the method further includes step 401a: The network device sends a first radio resource control RRC message, where the first RRC message includes a BWP_ID configuration field, the BWP_ID configuration field defines a value configuration of a BWP_ID increment, and the BWP_ID configuration field includes a maximum offset value and/or a minimum offset value.

Optionally, the first BWP_ID is carried in a second radio resource control RRC message.

Optionally, the first indication message is downlink control information DCI.

Figure 5:
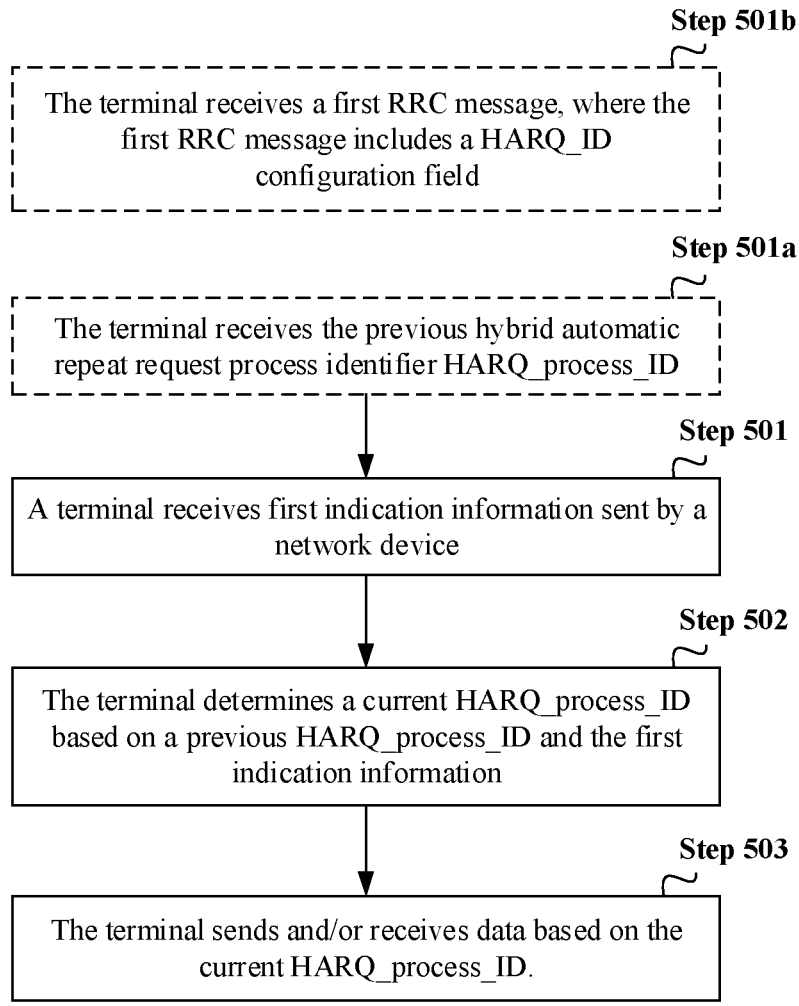
FIG. 5 is a schematic diagram of a process of an information indication applied to a hybrid automatic repeat request process identifier according to an embodiment of this application.

The foregoing separately describes the information indication manner from a terminal side and a network device side. The information indication manner may be further extended to other technical problems. The following describes an information indication manner applied to a hybrid automatic repeat request process identifier. The indication manner extends an indication range of a hybrid automatic repeat request process identifier on a premise of compatibility with a DCI format in conventional NR. A specific process may be shown in FIG. 5. The method includes the following steps.

Step 501: A terminal receives first indication information sent by a network device, where the first indication information includes offset information of a hybrid automatic repeat request process identifier HARQ_process_ID.

Step 502: The terminal determines a current HARQ_process_ID based on a previous HARQ_process_ID and the first indication information.

Step 503: The terminal sends and/or receives data based on the current HARQ_process_ID.

Optionally, before step 501, the method further includes step 501a: The terminal receives the previous hybrid automatic repeat request process identifier HARQ_process_ID.

Optionally, that the terminal receives offset information of a HARQ_process_ID includes: When the terminal receives Optionally, in another solution, the terminal receives a first RRC message, where the first RRC message includes a HARQ_ID configuration field, the HARQ JD configuration field defines a value configuration of a HARQ_ID, and the HARQ JD configuration field includes a first identifier offset value, a second identifier offset value, . . . , and an $N^{th}$ identifier offset value, where the identifier offset value is an integer, and N is an integer greater than or equal to 1. In another possible implementation, the identifier offset value may be the HARQ_process_ID corresponding to current scheduling. In this case, the terminal needs to learn of only the first indication information to determine the HARQ process identifier corresponding to current scheduling. Step 505 may be performed before step 501, or certainly may be performed before step 501a. For example, in an RRC message, a new field may be added to define a value configuration of a HARQ-ID, for example, a downlink HARQ-ID-offset-value and an uplink HARQ-ID-offset-value. For specific message content, refer to the following example.

```
ServingCellConfig ::=                          SEQUENCE {
    tdd-UL-DL-ConfigurationDedicated               TDD-UL-DL-ConfigDedicated
OPTIONAL,   -- Cond TDD
    initialDownlinkBWP                             BWP-DownlinkDedicated
OPTIONAL,   -- Need M
    downlinkBWP-ToReleaseList                      SEQUENCE   (SIZE
(1 . . . maxNrofBWPs)) OF BWP-Id               OPTIONAL,   -- Need N
    downlinkBWP-ToAddModList                       SEQUENCE   (SIZE
(1 . . . maxNrofBWPs)) OF BWP-Downlink         OPTIONAL,   -- Need N
    downlink-HARQ-ID-offset-value                  SEQUENCE (SIZE (1 . . . 16)) OF INTEGER
(-Maximum_offset, . . . , Maximum_offset)      OPTIONAL,   -- Need N
    firstActiveDownlinkBWP-Id                           BWP-Id
OPTIONAL,   -- Cond SyncAndCellAdd
    bwp-InactivityTimer                            ENUMERATED {ms2, ms3, ms4, ms5,
ms6, ms8, ms10, ms20, ms30,
                                                                 ms40,ms50,   ms60,
ms80,ms100, ms200,ms300, ms500,
                                                                 ms750,   ms 1280,
ms1920, ms2560, spare10, spare9, spare8,
                                                                 spare7,   spare6,
spare5, spare4, spare3, spare2, spare 1 }       OPTIONAL,   --Need R
    defaultDownlinkBWP-Id                               BWP-Id
OPTIONAL,   -- Need S
  . . .
}
    UplinkConfig ::=                            SEQUENCE {
        initialUplinkBWP                            BWP-UplinkDedicated
OPTIONAL,   -- Need M
    uplinkBWP-ToReleaseList                        SEQUENCE   (SIZE
(1 . . . maxNrofBWPs)) OF BWP-Id               OPTIONAL,   -- Need N
    uplinkBWP-ToAddModList                         SEQUENCE   (SIZE
(1 . . . maxNrofBWPs)) OF BWP-Uplink           OPTIONAL,   -- Need N
    firstActiveUplinkBWP-Id                             BWP-Id
OPTIONAL,   -- Cond SyncAndCellAdd
    uplink-HARQ-ID-offset-value                    SEQUENCE (SIZE (1 . . . 16)) OF INTEGER
(-Maximum_offset, . . . , Maximum_offset)      OPTIONAL,   -- Need N
    . . .
}
``` the offset information of the HARQ_process_ID, a preset condition for a scheduling result is met, and the offset information of the HARQ_process_ID indicates an offset of the HARQ process identifier.

Optionally, the method further includes step 501b: The terminal receives a first RRC message, where the first RRC message includes a HARQ_ID configuration field, the HARQ configuration field defines a value configuration of a HARQ_ID, and the HARQ JD configuration field includes a maximum offset value and/or a minimum offset value.

The downlink HARQ-ID-offset-value is used as an example for specific description. Maximum_offset indicates the maximum ID offset value defined in the system, and the offset has 16 values according to the setting in the SEQUENCE. A range from a minimum ID offset value to the maximum ID offset value is averaged to 16 values. It is easy to understand that the minimum ID offset value and the maximum ID offset value may be same or different in absolute value. A step between two offset values may also be changed. Examples are not provided herein one by one. This possible design differs from the foregoing in that the ID offset value is defined in the RRC message and delivered to the terminal.

In this optional design, based on a scheduling result, a network side obtains an offset value of a currently scheduled HARQ process identifier relative to a previously scheduled HARQ process identifier, maps a corresponding bit to a HARQ process identifier field in DCI according to a predefined table, and delivers the field to the terminal. For example, bits in different process identifier indication fields correspond to different downlink HARQ-ID-offset-values and/or uplink HARQ-ID-offset-values. A field length of four bits is used as an example. Fields related to HARQ process identifier indications in the DCI are shown in Table 3.

TABLE 3

HARQ-ID indication field in DCI

| HARQ process identifier indication field | HARQ ID offset |
| --- | --- |
| 0000 | $1^{st}$-downlink HARQ-process-ID-offset-value |
| 0001 | $2^{nd}$-downlink HARQ-process-ID-offset-value |
| 0010 | $3^{rd}$-downlink HARQ-process-ID-offset-value |
| 0011 | $4^{th}$-downlink HARQ-process-ID-offset-value |
| ... | ... |
| 1111 | $16^{th}$-downlink HARQ-process-ID-offset-value |

Optionally, the terminal receives first downlink control information DCI. The first DCI includes a HARQ process identifier field.

Specifically, the terminal receives the DCI indication from the network device, and the terminal determines the second HARQ_process_ID according to a preset formula for data sending and/or receiving. The preset formula includes: second HARQ_process_ID=first HARQ_process_ID+ HARQ process identifier offset.

The foregoing describes the communication method in embodiments of this application, and the following describes the communication apparatus in embodiments of this application. The method and the apparatus are based on a same technical idea. The method and the apparatus have similar principles for resolving problems. Therefore, for implementations of the apparatus and the method, refer to each other, and details of repeated parts are not described again.

Figure 6:
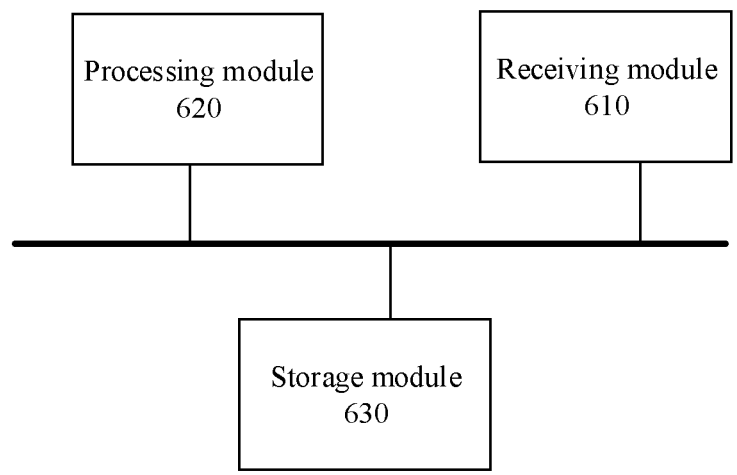
FIG. 6 is a schematic block diagram of a communication apparatus 600 according to an embodiment of this application.

Based on the same technical concept as the foregoing communication method, as shown in FIG. 6, a communication apparatus 600 is provided. The communication apparatus 600 can implement the steps performed by the terminal in the foregoing method. To avoid repetition, the steps are described herein briefly. The communication apparatus 600 may be a terminal device, for example, a handheld terminal; or may be a chip used in a terminal device. The communication apparatus 600 includes a receiving module 610 and a processing module 620. Optionally, the communication apparatus 600 further includes a storage module 630. The processing module 620 may be separately connected to the storage module 630 and the receiving module 610, and the storage module 630 may also be connected to the receiving module 610.

The storage module 630 is configured to store a computer program.

For example, the receiving module 610 is configured to receive first indication information, where the first indication information includes a bandwidth part BWP indication field, and the BWP indication field indicates a BWP identifier offset.

The processing module 620 is configured to determine a second bandwidth part identifier BWP_ID based on the BWP identifier offset, where the second BWP_ID corresponds to a target beam of the terminal.

The processing module 620 is further configured for switching to the target beam.

In a possible implementation, the processing module 620 is specifically configured to determine the second bandwidth part identifier BWP_ID based on the BWP identifier offset and a first bandwidth part identifier BWP_ID, where the first bandwidth part identifier BWP_ID corresponds to a current serving beam of the terminal.

In a possible implementation, before the receiving module 610 receives the first indication information, the receiving module 610 is further configured to receive the first bandwidth part identifier BWP_ID. It is easy to understand that the network device may receive the first BWP_ID only when the information indication method is used for a first time, and in subsequent information indication, the second BWP_ID and the corresponding target beam may be determined based on the buffered first BWP_ID and with reference to the first indication information. Certainly, besides that the first BWP_ID may be used when the information indication method is used for the first time, when the network device or the terminal detects that indication based on an BWP_ID is incorrect and needs to be corrected, the first BWP_ID may also be sent by the network device to the terminal. In addition, the first BWP_ID may also be sent by the network device to the terminal at regular time (periodically or irregularly).

In a possible implementation, that the receiving module 610 receives a bandwidth part BWP indication field includes: When the receiving module 610 receives the first indication information, a preset condition for satellite beam switching is met.

In a possible implementation, the receiving module 610 is further configured to receive a first RRC message, where the first RRC message includes a BWP_ID configuration field, the BWP_ID configuration field defines a value configuration of a BWP_ID, and the BWP_ID configuration field includes a maximum offset value and/or a minimum offset value. Alternatively, the receiving module 610 is alternatively configured to receive a first RRC message, where the first RRC message includes a BWP_ID configuration field, the BWP_ID configuration field defines a value configuration of a BWP_ID, and the BWP_ID configuration field includes a first identifier offset value, a second identifier offset value, ..., and an $N^{th}$ identifier offset value, where the identifier offset value is an integer, and N is an integer greater than or equal to 1. In another possible implementation, the identifier offset value may be the BWP_ID corresponding to the target beam. In this case, the terminal needs to learn of only the first indication information to determine that target beam switching is completed.

In a possible implementation, the first BWP_ID is carried in a second RRC message. The second RRC message is different from the first RRC message, and the first RRC message may be an initial RRC.

In a possible implementation, the first indication message is downlink control information DCI.

In a possible implementation, the processing module 620 is configured to determine the second BWP_ID according to a preset formula to perform beam switching. The preset formula includes: second BWP_ID=first BWP_ID+BWP identifier offset, where the first BWP_ID corresponds to the current serving beam of the terminal, and the second BWP_ID corresponds to the target beam of the terminal.

Figure 7:
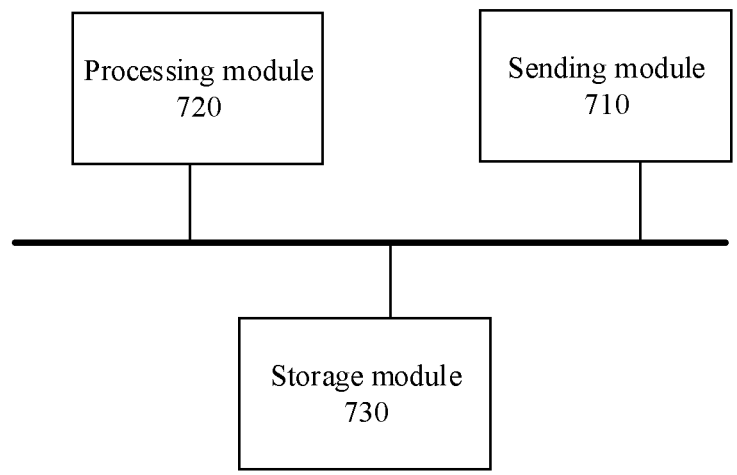
FIG. 7 is a schematic block diagram of a communication apparatus 700 according to an embodiment of this application.

Based on the same technical concept as the foregoing communication method, as shown in FIG. 7, a communication apparatus 700 is provided. The communication apparatus 700 can implement the steps performed by the network device in the foregoing method. To avoid repetition, the steps are described herein briefly. The communication apparatus 700 may be a network device, for example, a satellite, or referred to as a satellite base station; or may be a chip used in a network device, for example, a modem chip. The communication apparatus 700 includes a sending module 710 and a processing module 720. Optionally, the communication apparatus 700 further includes a storage module 730. The processing module 720 may be separately connected to the storage module 730 and the sending module 710, and the storage module 730 may also be connected to the sending module 710.

The storage module 730 is configured to store a computer program.

For example, the sending module 710 is configured to send a first bandwidth part identifier BWP_ID, where the first BWP_ID corresponds to a current serving beam of a terminal. The sending module 710 is further configured to send first indication information, where the first indication information includes a bandwidth part BWP indication field, the BWP indication field indicates a BWP identifier offset, and the BWP identifier offset indicates an offset value of an identifier of a target beam of the terminal relative to the first BWP_ID.

In a possible implementation, that the sending module 710 sends a bandwidth part BWP indication field includes: If the processing module 720 detects that a preset condition for satellite beam switching is met, the processing module 720 determines the bandwidth part BWP indication field based on the first BWP_ID and a second BWP_ID; and the sending module 710 sends the bandwidth part BWP indication field, where the second BWP_ID corresponds to the target beam serving the terminal.

In a possible implementation, the sending module 710 is further configured to send a first radio resource control RRC message. The first RRC message includes a BWP_ID configuration field, the BWP_ID configuration field defines a value configuration of a BWP_ID increment, and the BWP_ID configuration field includes a maximum offset value and/or a minimum offset value.

In a possible implementation, the first BWP_ID is carried in a second radio resource control RRC message.

In a possible implementation, the first indication message is downlink control information DCI.

In the terminal or the network device in embodiments of this application, a part of modules (or components) may be implemented by using a hardware circuit, and other modules (or components) may be implemented by using software; all modules (or components) may be implemented by using a hardware circuit; or all modules (or components) are implemented by using software.

Figure 8:
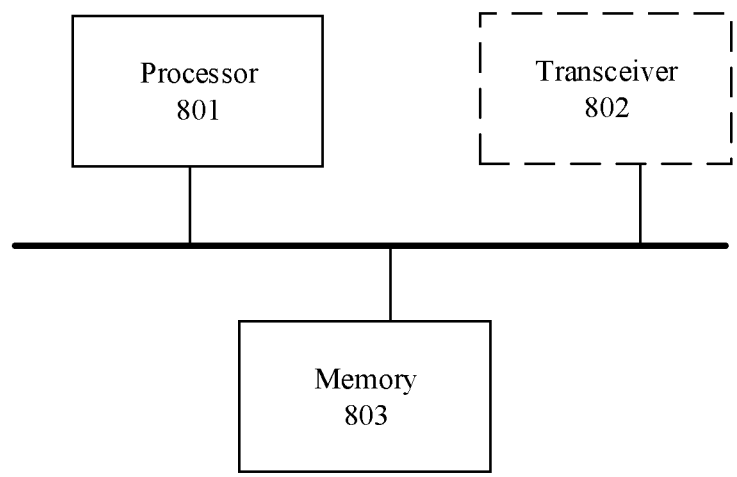
FIG. 8 is a schematic block diagram of a communication apparatus 800 according to an embodiment of this application.

FIG. 8 is a schematic block diagram of a communication apparatus 800 according to an embodiment of this application. It should be understood that the communication apparatus 800 can perform the steps performed by the terminal. To avoid repetition, details are not described herein again. The communication apparatus 800 includes a processor 801 and a memory 803. The processor 801 and the memory 803 are electrically coupled.

The memory 803 is configured to store computer program instructions.

The processor 801 is configured to execute a part or all of the computer program instructions in the memory. When the part or all of the computer program instructions are executed, the apparatus performs the steps performed by the terminal in the foregoing method.

Optionally, a transceiver 802 is further included, and is configured to communicate with another device, for example, to receive first indication information sent by a network device.

It should be understood that the communication apparatus 800 shown in FIG. 8 may be a chip or a circuit, for example, a chip or a circuit that may be disposed in the terminal. The transceiver 802 may alternatively be a communication interface. The transceiver includes a receiver and a transmitter. Further, the communication apparatus 800 may further include a bus system.

The processor 801, the memory 803, and the transceiver 802 are connected by using the bus system. The processor 801 is configured to execute the instructions stored in the memory 803, to control the transceiver to receive a signal and send a signal, to complete steps of the terminal device in the communication method in this application. The memory 803 may be integrated into the processor 801, or may be disposed separately from the processor 801.

In an implementation, it may be considered that functions of the transceiver 802 are implemented by using a transceiver circuit or a dedicated transceiver chip. It may be considered that the processor 801 is implemented by using a dedicated processing chip, a processing circuit, a processor, or a universal chip.

Figure 9:
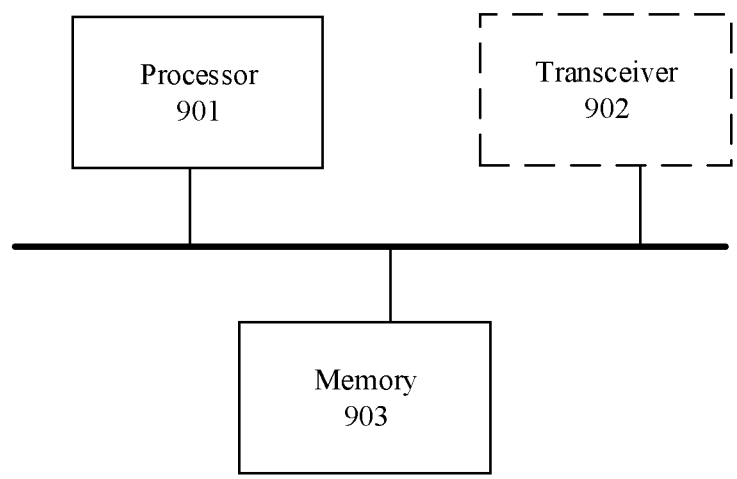
FIG. 9 is a schematic block diagram of another communication apparatus 900 according to an embodiment of this application.

FIG. 9 is a schematic block diagram of another communication apparatus 900 according to an embodiment of this application. It should be understood that the communication apparatus 900 can perform the steps performed by the network device. To avoid repetition, details are not described herein again. The communication apparatus 900 includes a processor 901 and a memory 903. The processor 901 and the memory 903 are electrically coupled.

The memory 903 is configured to store computer program instructions.

The processor 901 is configured to execute a part or all of the computer program instructions in the memory. When the part or all of the computer program instructions are executed, the apparatus is enabled to perform the steps performed by the network device in the foregoing method.

Optionally, the communication apparatus 900 further includes a transceiver 902, configured to communicate with another device, for example, send first indication information to a terminal device.

It should be understood that the communication apparatus 900 shown in FIG. 9 may be a chip or a circuit, for example, a chip or a circuit that may be disposed in the network device. The transceiver 902 may alternatively be a communication interface. The transceiver includes a receiver and a transmitter. Further, the communication apparatus 900 may further include a bus system.

The processor 901, the memory 903, and the transceiver 902 are connected by using the bus system. The processor 901 is configured to execute the instructions stored in the memory 903, to control the transceiver to receive a signal and send a signal, to complete steps of the network device in the communication method in this application. The memory 903 may be integrated into the processor 901, or may be coupled to the processor 901.

In an implementation, it may be considered that functions of the transceiver 902 are implemented by using a transceiver circuit or a dedicated transceiver chip. It may be considered that the processor 901 is implemented by using a dedicated processing chip, a processing circuit, a processor, or a universal chip.

The processor may be a central processing unit (CPU), a network processor (NP), or a combination of a CPU and an NP.

The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL) and another programmable logic device, a discrete gate or a transistor logic device, a discrete hardware component, or the like, or any combination thereof. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application is intended to include but is not limited to these memories and any other memory of a suitable type.

An embodiment of this application provides a computer storage medium storing a computer program. The computer program includes steps that are used to enable the computer to perform the steps performed by the foregoing terminal or network device.

An embodiment of this application provides a computer program product including instructions. When the computer program product runs on a computer, the computer is enabled to perform the steps performed by the foregoing terminal or network device.

A person skilled in the art should understand that embodiments of this application may be provided as a method, a system, or a computer program product. Therefore, this application may use a form of hardware-only embodiments, software-only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some embodiments of this application have been described, a person skilled in the art can make changes and modifications to these embodiments once they learn of the basic inventive concept. Therefore, the following claims are intended to be construed as to cover the preferred embodiments and all changes and modifications falling within the scope of this application.

Definitely, a person skilled in the art can make various modifications and variations to embodiments of this application without departing from the scope of embodiments of this application. This application is also intended to cover these modifications and variations to embodiments of this application provided that the modifications and variations fall within the scope of protection defined by the following claims and their equivalent technologies.

What is claimed is:

1. An information indication method, wherein the method comprises:
receiving, by a terminal, first indication information, wherein the first indication information comprises a bandwidth part (BWP) indication field, and the BWP indication field indicates a BWP identifier offset;
determining, by the terminal, a second bandwidth part identifier BWP_ID based on the BWP identifier offset, wherein the second BWP_ID corresponds to a target beam of the terminal; and
switching, by the terminal, to the target beam.

2. The method according to claim 1, wherein the determining, by the terminal, the second bandwidth part identifier BWP_ID based on the BWP identifier offset comprises:
   determining, by the terminal, the second bandwidth part identifier BWP_ID based on the BWP identifier offset and a first bandwidth part identifier BWP_ID, wherein the first bandwidth part identifier BWP_ID corresponds to a current serving beam of the terminal.

3. The method according to claim 2, wherein before the terminal receives the first indication information, the method further comprises:
   receiving, by the terminal, the first bandwidth part identifier BWP_ID.

4. The method according to claim 1, wherein the receiving, by the terminal, the bandwidth part BWP indication field comprises:
   when the terminal receives the first indication information, a preset condition for satellite beam switching is met.

5. The method according to claim 1, wherein the method further comprises:
   receiving, by the terminal, a first radio resource control (RRC) message, wherein the first RRC message comprises a BWP_ID configuration field, the BWP_ID configuration field defines a value configuration of a BWP_ID, and the BWP_ID configuration field comprises a maximum offset value or a minimum offset value.

6. The method according to claim 1, wherein the method further comprises:
   receiving, by the terminal, a first radio resource control (RRC) message, wherein the first RRC message comprises a BWP_ID configuration field, the BWP_ID configuration field defines a value configuration of a BWP_ID, and the BWP_ID configuration field comprises N identifier offset values, wherein each identifier offset value is an integer, and N is an integer greater than or equal to 1.

7. The method according to claim 2, wherein the first BWP_ID is carried in a second RRC message.

8. The method according to claim 1, wherein the first indication message is downlink control information (DCI).

9. The method according to claim 2, wherein the terminal determines the second BWP_ID according to a preset formula to perform beam switching, and the preset formula comprises:
   second BWP_ID=first BWP_ID+BWP identifier offset, wherein
   the first BWP_ID corresponds to the current serving beam of the terminal, and the second BWP_ID corresponds to the target beam of the terminal.

10. An information indication method, wherein the method comprises:
    sending, by a network device, a first bandwidth part identifier (BWP_ID), wherein the first BWP_ID corresponds to a current serving beam of a terminal; and
    sending, by the network device, first indication information, wherein the first indication information comprises a bandwidth part (BWP) indication field, the BWP indication field indicates a BWP identifier offset, and the BWP identifier offset indicates an offset value of an identifier of a target beam of the terminal relative to the first BWP_ID.

11. The method according to claim 10, wherein the sending, by the network device, the bandwidth part BWP indication field comprises:
    when the network device detects that a preset condition for satellite beam switching is met, determining, by the network device, the BWP indication field based on the first BWP_ID and a second BWP_ID, and sending, by the network device, the bandwidth part BWP indication field, wherein the second BWP_ID corresponds to the target beam serving the terminal.

12. The method according to claim 10, wherein the method further comprises:
    sending, by the network device, a first radio resource control (RRC) message, wherein the first RRC message comprises a BWP_ID configuration field, the BWP_ID configuration field defines a value configuration of a BWP_ID increment, and the BWP_ID configuration field comprises a maximum offset value or a minimum offset value.

13. The method according to claim 10, wherein the first BWP_ID is carried in a second radio resource control (RRC) message.

14. The method according to claim 10, wherein the first indication message is downlink control information (DCI).

15. A communication apparatus, wherein the apparatus comprises a processor and a transceiver, and the processor is electrically coupled to the transceiver;
    the transceiver is configured to receive first indication information, wherein the first indication information comprises a bandwidth part (BWP) indication field, and the BWP indication field indicates a BWP identifier offset; and
    the processor is configured to determine a second bandwidth part identifier (BWP_ID) based on the BWP identifier offset, wherein and the second BWP_ID corresponds to a target beam of the terminal; and
    the processor is configured to switch to the target beam.

16. The apparatus according to claim 15, wherein the processor is specifically configured to determine the second BWP_ID based on the BWP identifier offset and a first BWP_ID, wherein the first BWP_ID corresponds to a current serving beam of the terminal.

17. The apparatus according to claim 15, wherein before the transceiver receives the first indication information, the transceiver is further configured to receive the first BWP_ID.

18. The apparatus according to claim 15, wherein that the transceiver receives a BWP indication field comprises:
    when the transceiver receives the first indication information, a preset condition for satellite beam switching is met.

19. The apparatus according to claim 15, wherein
    the transceiver is further configured to receive a first RRC message, wherein the first RRC message comprises a BWP_ID configuration field, the BWP_ID configuration field defines a value configuration of a BWP_ID, and the BWP_ID configuration field comprises a maximum offset value and/or a minimum offset value.

20. The apparatus according to claim 15, wherein
    the transceiver is further configured to receive a first RRC message, wherein the first RRC message comprises a BWP_ID configuration field, the BWP_ID configuration field defines a value configuration of a BWP_ID, and the BWP_ID configuration field comprises N identifier offset values wherein each identifier offset value is an integer, and N is an integer greater than or equal to 1.

* * * * *